United States Patent [19]

Shah

[11] 4,357,442

[45] Nov. 2, 1982

[54] STABLE LATEXES OF CARBOXYL CONTAINING POLYMERS

[75] Inventor: Pravinchandra K. Shah, Sheffield Lake, Ohio

[73] Assignee: The B. F. Goodrich Company, Akron, Ohio

[21] Appl. No.: 328,321

[22] Filed: Dec. 7, 1981

[51] Int. Cl.$^3$ .............................................. C08K 5/36
[52] U.S. Cl. ..................................................... 524/745
[58] Field of Search ........................................ 524/745

[56] References Cited

U.S. PATENT DOCUMENTS

| | | | |
|---|---|---|---|
| 2,859,191 | 11/1958 | Turnbull | 524/745 |
| 3,055,855 | 9/1962 | Anderson et al. | 524/745 |
| 3,432,455 | 3/1969 | Rasicci | 524/745 |
| 3,480,578 | 11/1969 | Witt | 524/745 |
| 3,711,437 | 1/1973 | Wieland et al. | 524/745 |
| 4,327,004 | 4/1982 | Schmidt et al. | 524/745 |

*Primary Examiner*—Joseph L. Schofer
*Assistant Examiner*—N. Sarofim
*Attorney, Agent, or Firm*—J. Hughes Powell, Jr.

[57] ABSTRACT

Viscosity stable polymers containing bound carboxyl groups in latex form when compounded at high solids content and at a high pH are obtained in accordance with this invention when the latex is prepared by polymerizing butadiene or an acrylic or methacrylic ester with an unsaturated carboxylic acid in the presence of an olefin sulfonate emulsifier. The olefin sulfonates contain a major proportion of $C_{14}$ to $C_{16}$ aliphatic carbon atoms. By use of this emulsifier, high total solids, viscosity stable latexes can be obtained by direct polymerization.

12 Claims, No Drawings

STABLE LATEXES OF CARBOXYL CONTAINING POLYMERS

BACKGROUND OF THE INVENTION

Polymers containing bound reactive groups in latex form have many commercial applications. The polymers of said latexes include, for example, copolymers of butadiene, acrylonitrile and methacrylic acid; copolymers of acrylonitrile, styrene, methacrylic acid and N-methylolacrylamide; copolymers of alkyl acrylates and acrylic acid; copolymers of alkyl acrylates such as ethyl acrylate and butyl acrylate with crylic acid and N-methylolacrylamide and the like. These latexes are used in a variety of industrial applications, including, for example, in the manufacture of non-woven fabrics and paper, both as impregnates, coating materials and in adhesive applications. For many such applications, these latexes are compounded with a variety of ingredients and at an alkaline pH. On storage, many such compounded carboxyl containing latexes tend to thicken and otherwise become difficult to handle.

In many applications, these latexes are compounded with pigments, thickeners and/or plasticizers and the compounds often adjusted to a pH above 8 to 9. Further, the maximum total solids polymer in the latexes that is practical for handling is normally most desirable. Such latexes, when compounded, are usually viscous. With many such latexes and compounds, it is difficult to keep the compound close to the initial viscosity desired for use over several weeks to maintain desirable physical and rheological properties. This is to obtain the desired physical properties in the end product and for processability. If the initial compounded viscosity and stability cannot be controlled, as is often the case, severe problems and losses often occur or an uncontrolled viscosity rise often causes the compound to gel and become useless. While this may be controlled to some extent by diluting the latex with water to a lower viscosity, this normally results in compounds with undesirable rheology, low polymer coating weight and excessive energy conditions to evaporate the extra water which results in slower machine speeds and loss of production in many applications.

SUMMARY OF THE INVENTION

Viscosity stable polymers containing bound carboxyl groups in latex form when compounded at high solids content and at a high pH are obtained in accordance with this invention when the latex is prepared with an olefin sulfonate emulsifier. These olefin sulfonates contain a major proportion of $C_{14}$ to $C_{16}$ aliphatic carbon atoms. By use of this emulsifier, high total solids, viscosity stable latexes can be obtained by direct polymerization.

DETAILED DESCRIPTION

Normally, the polymers of the latex are either butadiene based or alkyl acrylate based, that is they contain a major proportion of either butadiene or an alkyl acrylate, copolymerized with an unsaturated carboxylic acid, optionally with acrylamide or a N-alkylolacrylamide. The polymer may also contain other vinylidene monomers having at least one terminal $CH_2 \leqq$ group. While viscosity problems on compounding and storage may be observed with compounded high total solid latexes of polymers containing carboxyl groups as the reactive group, the problems are compounded when there is also present as one of the copolymerized monomers in the molecule, acrylamide or alkacrylamides, and particularly N-alkylol acrylamide or methacrylamides. Typical polymer compositions are described below.

The butadiene-1,3 polymers normally will contain more than 50 weight percent of butadiene-1,3 with 0 to 49.9 weight percent of vinylidene monomers such as styrene, acrylonitrile, alkyl acrylates and methacrylates, about 0.1 to 10 weight percent of an unsaturated carboxylic acid such as acrylic acid, methacrylate or itaconic acid and the like, and optionally, an unsaturated amide such as acrylamide, N-methylolacrylamide, and the like.

The alkyl acrylates are acrylate ester monomers of acrylic acid that have the formula

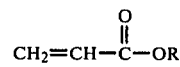

where R is selected from the group consisting of an alkyl radical containing 1 to 18 carbon atoms, an alkoxyalkyl radical containing a total of 1 to 10 carbon atoms, and a cyanoalkyl radical containing 1 to 10 carbon atoms. The alkyl structure can contain primary, secondary, or tertiary carbon configurations and normally contains 1 to 8 carbon atoms. Examples of such acrylic esters are ethyl acrylate, propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxy ethyl acrylate, ethoxypropyl acrylate, and the like: $\alpha$ and $\beta$-cyanoethyl acrylate, $\alpha,\beta$-and $\gamma$-cyanopropyl acrylate, cyanobutyl acrylate, cyanohexyl acrylate, cyanooctyl acrylate, and the like; hydroxyalkyl acrylates as hydroxyethyl acrylates and the like and mixtures thereof.

More preferred are the acrylic esters wherein R is an alkyl radical containing 2 to about 8 carbon atoms or an alkoxyalkyl radical containing a total of 2 to about 6 carbon atoms. Examples of such more preferred monomers are ethyl acrylate, propyl acrylate, n-butyl acrylate, n-pentyl acrylate, n-hexyl acrylate, n-octyl acrylate, 2-ethylhexyl acrylate, and the like; methoxyethyl acrylate, ethoxyethyl acrylate, and the like; and mixtures thereof.

The acrylic ester monomers are used in amounts of at least 30 percent by weight of the total weight of monomer charged. More preferably, they are used in the ranges from about 50 percent to about 99.9 percent by weight of the monomers charged.

The carboxylic monomers useful in the production of the polymer latexes of this invention are the olefinically-unsaturated carboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group thusly

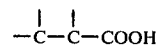

or as a part of a terminal methylene grouping thusly CH₂C<. Olefinically-unsaturated acids of this broad class includes such widely divergent materials as the acrylic acids such as acrylic acid itself, methacrylic acid, ethacrylic acid, alpha-chloro acrylic acid, alpha-cyano acrylic acid, and others, crotonic acid, sorbic acid, cinnamic acid, hydromuconic acid, itaconic acid, citraconic acid, mesaconic acid, muconic acid, glutaconic acid, aconitic acid and others. As used herein, the term "carboxylic acid" includes the polycarboxylic acids and acid anhydrides, such as maleic anhydride, wherein the anhydride group is formed by the elimination of one molecule of water from two carboxyl groups located on the same polycarboxylic acid molecule.

The preferred carboxylic monomers for use in this invention are the monoolefinic acrylic acids having the general structure

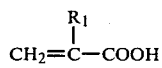

wherein $R_1$ is a substituent selected from the class consisting of hydrogen, halogen, monovalent alkyl radicals, monovalent aryl radicals, monovalent aralkyl radicals, monovalent alkaryl radicals and monovalent cycloaliphatic radicals. Illustrative acrylic acids of this class are acrylic acid itself, methacrylic acid, ethacrylic acid, chloro-acrylic acid, bromo-acrylic acid, cyano-acrylic acid, alpha-phenyl acrylic acid, alpha-benzyl acrylic acid, alpha-cyclohexyl acrylic acid, and others. Of this class, acrylic acid and methacrylic acid, along with itaconic acid are preferred. Another carboxylic monomer is maleic anhydride (acid). The amount of acid used normally will be from about 0.1 to 10 weight percent, normally to 5 weight percent.

The monoolefinically unsaturated amides which may be incorporated in the copolymers of this invention in minor proportions, i.e., 0 to 5.0, as 3.8, weight percent, and have at least one hydrogen on the amide nitrogen and the olefinic unsaturation is alpha-beta to the carbonyl group. Included are acrylamide, methacrylamide, N-methyl acrylamide, N-t-butyl acrylamide, N-cyclohexyl acrylamide, N-ethyl acrylamide and others containing at least one hydrogen on the amide nitrogen. Preferred are amides having the structure

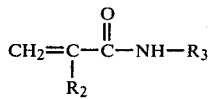

wherein $R_2$ is a member of the group consisting of hydrogen and an alkyl group having from 1 to 4 carbon atoms and $R_3$ is a member of the group consisting of hydrogen and an alkyl group having from 1 to 6 carbon atoms. Most preferred are acrylamide and methacrylamide in amounts of 0.1 to 2.5 weight percent.

The N-alkylol and N-alkoxy amides of alpha,beta-olefinically unsaturated carboxylic acids embodied herein include those having from 4 to 10 carbon atoms such as N-methylol acrylamide, N-ethanol acrylamide, N-propanol acrylamide, N-methylol methacrylamide, N-ethanol methacrylamide, n-butoxy acrylamide and isobutoxy acrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type because of their ready availability and relative low cost are the N-alkylol amides of alpha,beta-monoolefinically unsaturated monocarboxylic acids and the most preferred are N-methylol acrylamide and N-methylol and n-butoxy methacrylamide, preferably in amount of 0.2 to 5, as 2.5, weight percent.

Other vinyl monomers containing a terminal vinylidene group (CH₂C<) can be polymerized with the acrylate esters or butadiene-1,3 usually to obtain a film forming or elastomeric polymer. These monomers can be used in amount up to about 40 to 50 percent by weight based on the total weight of monomers charged. Examples of such monomers are vinyl and allyl ethers such as vinyl methyl ether, vinyl ethyl ether, allyl methyl ether, and the like; vinyl and allyl esters such as vinyl acetate, vinyl propionate, allyl acetate, allyl laurate, and the like; vinyl ketones such as methyl vinyl ketone, ethyl vinyl ketone, methyl isopropenyl ketone, hydroxymethyl vinyl ketone and the like; methyl acrylate, cyclohexyl acrylate, phenyl acrylate, and the like; alkyl methacrylates and ethacrylates such as methyl methacrylate, ethyl methacrylate, hexyl methacrylate, and the like; vinyl aromatics such as styrene and its alkyl and halo substitutents, vinyl toluene, and the like; vinyl halides such as vinyl chloride, vinylidene chloride, and the like; vinyl nitriles such as acrylonitrile and methacrylonitrile; β-cyanoalkyl acrylates as ethyl, and the like; and also dienes and divinyls such as butadiene, isoprene, 1,4-hexadiene, and the like, and divinyl ether, diallyl ether, divinyl benzene, diethylene glycol diacrylate, glycidyl acrylate, 2-hydroxyethyl-5-norbornenand and like; divinyl benzene and mixtures thereof. The more preferred copolymerizable vinylidene monomers are vinyl acetate, methyl and ethyl methacrylate, vinyl chloride, vinylidene chloride, styrene and acrylonitrile, acrylic and methacrylic acid and alkyl esters containing 10 to 30 carbon atoms in the alkyl groups.

The polymer may also contain an active halogen-containing monomer. The halogen groups can be chlorine, bromine, or iodine. Examples of such monomers are vinyl chloroacetate, vinyl bromoacetate, allyl chloroacetate, vinyl chloropropionate, 2-chloroethyl acrylate, 3-chloropropyl acrylate, 2-chloroethyl methacrylate, 2-chloroethyl vinyl ether, chloromethyl vinyl ketone, vinyl benzyl chloride, and the like. The preferred monomers are vinyl chloroacetate, allyl chloroacetate, 2-chloroethyl acrylate, 2-chloroethyl vinyl ether and vinyl benzyl chloride.

The olefin sulfonates used in the practice of this invention have the formula RCH=CH(CH₂)xSO₃Y wherein R is $C_{12}$ to $C_{16}$, and preferably is a major proportion of $C_{14}$ with a minor proportion of $C_{16}$. For example, about two-thirds (66%) $C_{14}$ alkyl and one-third (33%) $C_{16}$ alkyl and x is 0 to 6. Aliphatic olefins containing 1 olefin per molecule are used as starting materials. These can be prepared by polymerizing ethylene with Ziegler catalyst to produce $C_{12}$ to $C_{20}$ even numbered terminal olefins. These materials may contain from about 70 to 98% vinyl type olefins, R—CH=CH₂, and lesser amounts of vinylidene olefins,

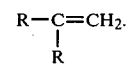

Preferably the olefin contains greater than 90% vinyl type olefin. A $C_{14}$–$C_{16}$ distillation fraction is made in a ratio of about 2 to 1 $C_{14}$–$C_{16}$ which is then reacted with $SO_3$ and alkali hydroxide to form the desired $R-CH=CH-CH_2-SO_3Y$ and Y is an alkali metal ion usually K or Na.

These olefin sulfonates normally contain materials of the structure.

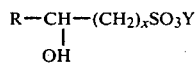

wherein R and Y have the meanings set forth above. The amount of these hydroxyl alkanesulfonates may vary, but preferably is less than 50 weight percent of the mixture and a range from about 25 to 35 weight percent has been found to be useful. The amount of olefin sulfonate used in the polymerization may vary from about 0.05 to 5 weight parts per 100 weight parts of monomer, more usually about 0.5 to 3.

Other known sodium alkyl sulfates or sulfonates normally used in the preparation of polymers containing bound carboxyl groups include sodium lauryl sulfate, sodium n-dodecylbenzene sulfonate, a sodium alkyl sulfonate wherein the alkyl averages $C_{18}H_{37}$ and a sodium alkyl sulfonate containing about 75% $C_{14}$ to $C_{16}$ saturated alkyl groups with the remainder of about half and half $C_{10}$ to $C_{13}$ and $C_{17}$ to $C_{18}$. None of these materials provide latices of carboxyl containing polymers having the desired viscosity stability on storage.

The latexes can be prepared using emulsion techniques known to those skilled in the art. The monomers are usually polymerized to above 90 percent conversion, as 98%. The polymerization can be performed as batch reactions or one or more ingredients can be proportioned during the run. Temperatures of polymerization normally range from about $-10°$ C. to about $95°$ C. The polymerizations are preferably conducted in the absence of air or oxygen.

The polymerization may be initiated by free-radical generating agents in amounts to cause essentially complete conversion of monomers to polymers. Examples of such agents are organic peroxides and hydroperoxides such as benzoyl peroxide, dicumyl peroxide, cumene hydroperoxide, paramethane hydroperoxide, and the like; used alone or with redox systems; azo compounds such as azobisisobutyronitrile, and the like; persulfate salts such as sodium, potassium, and ammonium persulfate, used alone or with redox systems in amounts of 0.05 to 1 weight part, and the use of ultraviolet light with photosensitive agents such as benzophenone, triphenylphosphine, organic azos, and the like.

Typical emulsion polymerization ingredients would include a persulfate salt or an organic peroxide, including redox systems, water adjusted to a desired pH with acids or bases, and usually buffered with inorganic salts and the alkyl olefin sulfonate. The ratio of water to monomer is such as to obtain economical concentrations of polymer in the latex, greater than 10 weight percent to about 65 weight percent or higher. Ratios of 150 water: 100 monomer to 50:100 are normally used.

The viscosity stable reactive latexes of this invention may be compounded with any of the known compounding ingredients used by those skilled in the art for latex applications, for example, in coatings and adhesives. The latexes are normally adjusted to a pH greater than 7, normally in the range of about 8 to 9.5 with alkaline materials including ammonia, sodium or potassium hydroxide amines, calcium and magnesium oxide and hydroxide and other known alkaline materials. Other typical compounding ingredients include, for example, pigments such as titanium dioxide; coloring agents; fillers such as clay and calcium carbonate; thickeners, including, for example, cross-linked polyacrylic acid, carboxymethylcellulose, hydroxyethylcellulose and the like; tackifiers; stabilizers; heat sensitizers; processing aids, and other useful compounding additives.

Viscosity measurements are determined with a Brookfield Viscometer that is well known in the art wherein a cylinder disc is rotated in the sample fluid and the torque necessary to overcome the viscous resistance to the induced moment is measured. Normally the LVT model is used for measuring low viscosity latex and a RVT model for measuring high viscosity such as that obtained in compounds.

In the practice of the invention, the following general polymerization recipe is followed.

| Ingredients | Weight Parts |
| --- | --- |
| Water | 85 |
| Ammonium carbonate | 0.25 |
| Emulsifier | 1.8 |
| Ethyl acrylate | 92 |
| Acrylonitrile | 5 |
| N—methylol acrylamide | 1.5 |
| Acrylic acid | 1.5 |
| Ammonium persulfate | 0.3 |

The reaction is conducted at a temperature of about 80° C. while metering in a mixture of monomers, about one-third of the water and emulsifier over about a 2 hour period, reacted to conversion of monomers to polymers of about 98%.

Four different emulsifiers were used in four different polymerizations. Sodium lauryl sulfate, a $C_{14}$–$C_{16}$ sodium olefin sulfonate containing 66.6% of R is $C_{14}$ and 33.3% of R is $C_{16}$, and said sulfonate contains about 35 weight percent sodium hydroxyl alkane sulfonate wherein R has the same carbon content and ratio as the sodium olefin sulfonate containing 66.6 weight percent $C_{14}$ and 33.3 weight percent $C_{16}$ alkyl groups sodium and dodecylbenzene sulfonate and a sodium alkyl sulfonate wherein the alkyl averages $C_{18}H_{37}$. Types and amounts of emulsifier and the properties of the latexes are set forth in Table I.

TABLE I

| Emulsifiers | | I | II | III | IV | V | VI |
| --- | --- | --- | --- | --- | --- | --- | --- |
| | Sodium lauryl sulfate | | 1.76 | 1.82 | | | |
| | Olefin sulfonate | 1.76 | | | 1.82 | | |
| | Linear alkyl benzene sulfonate | | | | | | 1.82 |
| | Alkyl sulfonate | | | | | 1.82 | |
| Total Solids | | 53.4 | 52.8 | 50.25 | 49.2 | 51.99 | 51.55 |
| pH | | 5.1 | 5.1 | 4.94 | 4.82 | 4.39 | 4.76 |
| Viscosity CP | | 600 | 800 | 141 | 39 | 730 | 130 |

TABLE I-continued

|  | I | II | III | IV | V | VI |
|---|---|---|---|---|---|---|
| (spindle-RPM) | (4–30) | (4–30) | (2–60) | (1–60) | (3–60) | (2–60) |
| Surface Tension dynes/cm | 44 | 43.2 | 37.5 | 37.0 | 34.1 | 35.1 |

The latexes of the Examples were all adjusted with varying amounts of ammonium hydroxide or sodium hydroxide as shown in Table II set forth below and the resulting viscosity measured after 1 hour, 1 day, 13 days and 33 days. All four latexes were prepared using the same level of each emulsifier and were diluted to 49.2% total solids for testing. All latexes were adjusted to a pH of about 9.8 with 14% and 28% ammonium hydroxide. Data is also included showing the effect of adjusted latex pH to about 9.8 with 10% sodium hydroxide.

TABLE II
Viscosity Stability Using Different Emulsifiers
(110 grams of 49.2% Solids Latex used for each Test)

| Identification | Original pH | Amount of 14% NH$_4$OH in grams | ≃1 hr. pH | visc. CP's | 1 day pH | visc. CP's | 13 days pH | visc. CP's | 33 days pH | visc. CP's |
|---|---|---|---|---|---|---|---|---|---|---|
| III sodium lauryl sulfate | 4.9 | 3.8 | 9.8 | 450 (2–60) | 9.8 | 415 (2–60) | 9.4 | 860 (3–60) | 9.3 | 1740 (3–60) |
| IV olefin sulfonate | 4.8 | 3.5 | 9.8 | 120 (2–60) | 9.55 | 115 (2–60) | 9.4 | 107.5 (2–60) | 9.25 | 137.2 (2–60) |
| V alkyl sulfonate | 4.4 | 3.8 | 9.8 | 182.5 (2–60) | 9.7 | 200 (2–60) | 9.4 | 352 (2–60) | 9.3 | 560 (3–60) |
| VI alkyl benzene sulfonate | 4.8 | 3.1 | 9.8 | 260 (2–60) | 9.7 | 292.5 (2–60) | 9.4 | 395 (2–60) | 9.2 | 600 (3–60) |

|  | Amount of 28% NH$_4$OH in grams | 1 hr. pH | visc. CP's | 1 day pH | visc. CP's | 13 days pH | visc. CP's | 33 days pH | visc. CP's |
|---|---|---|---|---|---|---|---|---|---|
| sodium lauryl sulfate | 1.23 | 9.8 | 600 (3–60) | 9.8 | 460 (3–60) | 9.4 | 960 (3–60) | 9.2 | 1880 (3–60) |
| olefin sulfonate | 1.27 | 9.8 | 145 (2–60) | 9.8 | 145 (2–60) | 9.4 | 165 (2–60) | 9.25 | 255 (2–60) |
| alkyl sulfonate | 1.47 | 9.8 | 212.5 (2–60) | 9.7 | 235 (2–60) | 9.5 | 482 (2–60) | 9.4 | 800 (3–60) |
| alkyl benzene sulfonate | 1.49 | 9.8 | 330 (2–60) | 9.8 | 370 (2–60) | 9.6 | 660 (3–60) | 9.4 | 960 (3–60) |

|  | Original pH | Amount of 10% NaOH in grams | ≃1 hr. pH | visc. CP's | 1 day pH | visc. CP's | 13 days pH | visc. CP's | 33 days pH | visc. CP's |
|---|---|---|---|---|---|---|---|---|---|---|
| sodium lauryl sulfate |  | 3.9 | 9.8 | 600 (3–60) | 9.7 | 600 (3–60) | 9.0 | 520 (3–60) | 8.7 | 500 (3–60) |
| olefin sulfonate |  | 3.9 | 9.8 | 132 (2–60) | 9.4 | 125 (2–60) | 8.85 | 65 (2–60) | 8.6 | 50 (2–60) |
| alkyl sulfonate |  | 4.0 | 9.9 | 197 (2–60) | 9.6 | 265 (2–60) | 8.8 | 325 (2–60) | 8.6 | 300 (2–60) |
| alkyl benzene sulfonate |  | 3.84 | 9.85 | 322 (2–60) | 9.6 | 380 (2–60) | 8.9 | 337 (2–60) | 8.6 | 290 (2–60) |

These latexes find particular applicability and utility in latex compounds for use, for example, as adhesives, to take advantage of the viscosity stability of both the latex and the latex compound, even after substantial storage. A general recipe is follows:

| The Compound Recipe | Parts Dry Weight |
|---|---|
| Latex | 100 |
| Filler | 30–150 |
| Cross-linking agent | 0.2 to 10 |
| Soap-for stable foam | .01 to 5 |
| pH | >8 |

A typical compound would be the latex prepared with a sodium olefin sulfonate as described, compounded with 80 parts of a 10/70 ratio of TiO$_2$/clay in a 70% water slurry, 1 part of a melamine-formaldehyde resin (Cymel 303) cross-linking agent, 2.5 parts of ammonium stearate soap, ammonium hydroxide added to adjust the pH to 10 and water to adjust the total solids of the compound to 52.5 Samples of this latex compound were kept in an oven at 95° C. and the viscosity tested over a 14 day period. The results obtained were: a viscosity at room temperature on the first day of 325, 425 after one day, 500 after three days, 850 after seven days and 1600 after fourteen days. This is to be compared to a similar latex made with sodium lauryl sulfate that had an initial viscosity of 725, a viscosity after one day of 1500, a viscosity after three days of 2200, a viscosity after seven days of 5600, and a viscosity after 14 days of 11,300, thus clearly demonstrating the unexpected advantage from the use of latexes of this invention in a compounded form.

Based on these data, it is obvious that the latex prepared with the olefin sulfonates has the lowest initial viscosity and the best viscosity stability during storage. These data clearly indicate the unexpected superiority of the olefin sulfonate and its stability to thickening over a period of time at high pH as compared to latexes made with sodium lauryl sulfate, sodium alkylbenzene sulfonates and sodium alkyl sulfonates.

The improved latexes of this invention have many applications where stable reactive latexes, particularly when compounded, are required. This is of particular advantage for small processors who purchase compounded latexes from custom compounders because such compounded latex must be shipped and sufficient quantities kept on hand to sustain production rates. It is essential that the viscosity of such compounded latexes stay substantially constant or at least within a processability range under storage and use conditions. The novel latexes of the invention find particular use in coating and adhesive applications, for example, as binders for pigments and as adhesives for non-woven fabrics.

I claim:

1. A process for preparing viscosity stable latexes of polymers containing bound carboxyl groups comprising polymerizing butadiene-1,3 or an ester of acrylic or methacrylic acids with an olefinically unsaturated carboxylic acid in an aqueous emulsion with a free radical forming initiator in the presence of 0.05 to 5 weight parts of an olefin sulfonate emulsifier having the formula $RCH=CH(CH_2)xSO_3Y$ wherein x is 0 to 6 and Y is an alkali metal ion and R is $C_{12}$ to $C_{16}$.

2. A process of claim 1 wherein a major proportion of butadiene or an ester of acrylic acid containing alkyl groups containing 1 to 10 carbon atoms is polymerized with about 0.1 to 10 weight parts of a carboxylic acid having the general structure

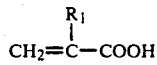

wherein $R_1$ is hydrogen, halogen, methyl or ethyl, and wherein a major portion of the olefin sulfonate is made of compounds wherein R is $C_{14}$ to $C_{16}$ and less than 50 weight percent based on total sulfonates, of hydroxy alkyl sulfonates of the formula

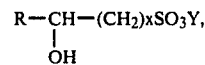

where Y is sodium are also present.

3. A process of claim 2 wherein said carboxylic acid is acrylic or methacrylic acid, and the butadiene-1,3 or the alkyl acrylates are also copolymerized with about 0 to 5 weight parts of N-alkylol or N-alkoxy amides of an α,β-olefinically unsaturated carboxylic acid containing 4 to 10 carbon atoms.

4. A process of claim 3 wherein said N-alkylol amide is N-methylolacrylamide present in amounts from about 0.2 to 2.5 weight percent.

5. A process of claim 4 wherein said butadiene is copolymerized with 0 to 49.9 weight percent of a vinylidene monomer selected from the group consisting of styrene, acrylonitrile, vinyl acetate, alkyl acrylates and methacrylates wherein the alkyl groups contain 1 to 8 carbon atoms.

6. A process of claim 4 wherein said alkyl acrylate containing 2 to 8 carbon atoms in the alkyl group is copolymerized with 0 to 70 weight percent of a vinylidene monomer selected from the group consisting of styrene, acrylonitrile, vinyl chloride and alkyl methacrylates wherein the alkyl groups contain 10 to 30 carbon atoms.

7. A viscosity stable latex prepared in accordance with the process of claim 1.

8. A viscosity stable latex prepared in accordance with the process of claim 2.

9. A viscosity stable latex prepared in accordance with the process of claim 3.

10. A viscosity stable latex prepared in accordance with the process of claim 4.

11. A viscosity stable latex prepared in accordance with the process of claim 5.

12. A viscosity stable latex prepared in accordance with the process of claim 6.

* * * * *